UNITED STATES PATENT OFFICE.

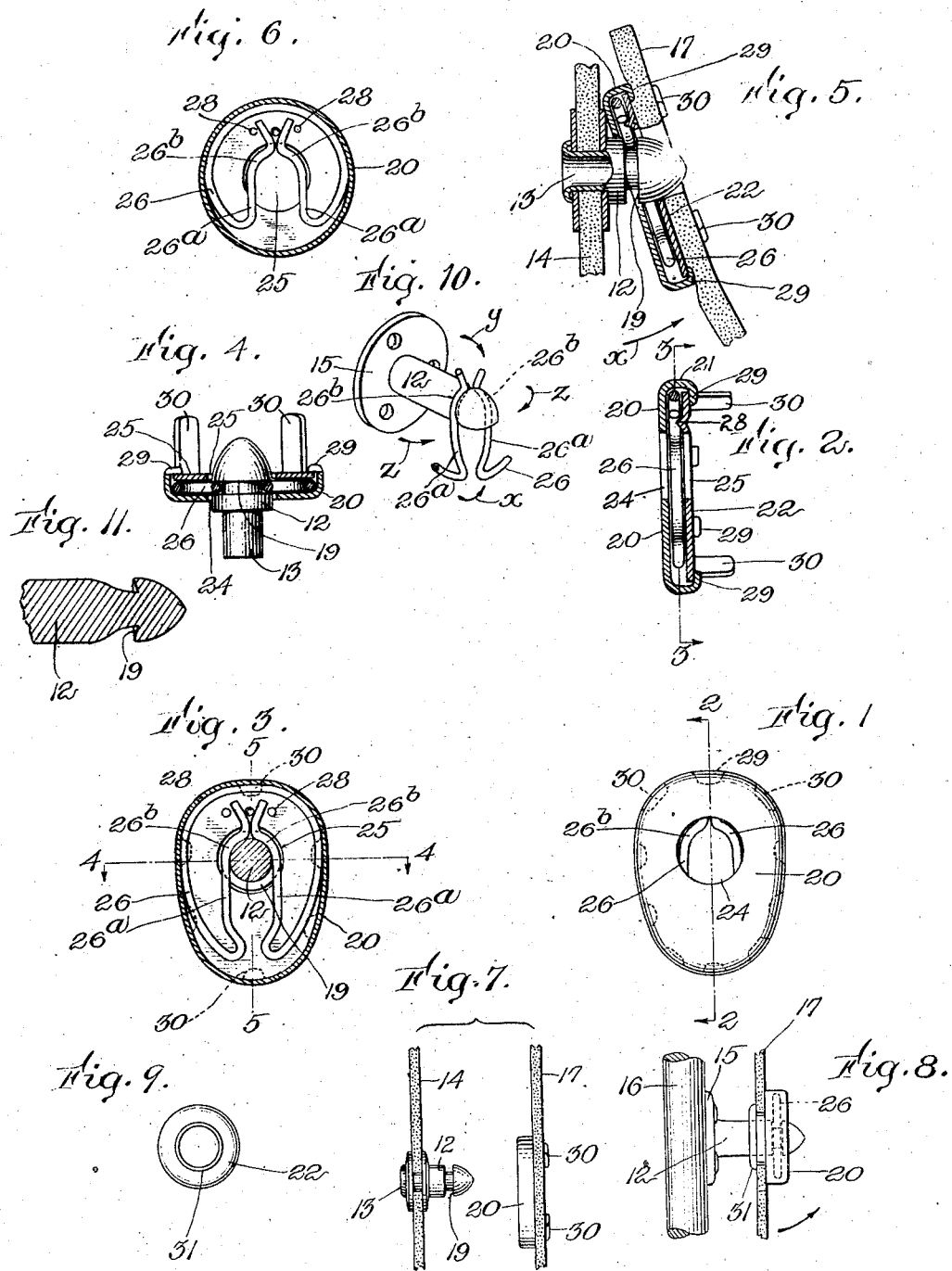

FRED S. CARR, OF BROOKLINE, MASSACHUSETTS, ASSIGNOR TO CARR FASTENER COMPANY, OF BOSTON, MASSACHUSETTS, A CORPORATION OF MAINE.

STUD-AND-SOCKET FASTENER.

1,038,288.     Specification of Letters Patent.     Patented Sept. 10, 1912.

Application filed May 2, 1910. Serial No. 559,005.

*To all whom it may concern:*

Be it known that I, FRED S. CARR, of Brookline, in the county of Norfolk and State of Massachusetts, have invented certain new and useful Improvements in Stud-and-Socket Fasteners, of which the following is a specification.

This invention relates to a stud and socket fastener of the type shown in Letters Patent of the United States, granted to me October 31, 1905, No. 803,468, said fastener comprising a socket member having a pair of yielding jaws, and a stud member having abrupt shoulders on opposite sides adapted to positively engage said jaws to prevent separation of the members while the engaging faces of the shoulders and the jaws are in parallel planes, and the stud member also having additional parts to act upon said jaws and to disengage said shoulders and jaws when said faces are moved out of parallel planes. The stud member of said patented fastener is of such form that its attachment in a predetermined position to the part which carries it is essential, in order that the jaw-engaging and displacing portions of the stud member may be properly arranged to perform their functions.

The present invention has for its object to provide an improved construction which obviates the necessity of special care in locating the stud member on the part which carries it, so that said member may be applied without providing for the location of either side of the stud member in a predetermined position relatively to its support, or in other words, without the necessity of so attaching the stud member to its support that a given side of the stud member shall face in a given direction.

The invention also has for its object to provide certain improvements in the socket member of a fastener of the above type whereby, when the jaws are displaced by the entering outer portion of the stud member before they spring into engagement with the shoulder of the latter, an increased stress is set up in said jaws tending to accelerate their engagement with the shank of the stud member so that the said engagement will be attended with a sharp click indicating to the operator that the desired engagement has been effected.

The invention consists in the improvements which I will now proceed to describe and claim.

Of the accompanying drawings which form a part of this specification,—Figure 1 represents a side view of the socket member of a fastener embodying my invention. Fig. 2 represents a section on line 2—2 of Fig. 1. Fig. 3 represents a section on line 3—3 of Fig. 2, and a transverse section of the stud member engaged with the jaws of the socket member. Fig. 4 represents a section on line 4—4 of Fig. 3. Fig. 5 represents a section on line 5—5 of Fig. 3 showing the socket member partially disengaged from the stud member. Fig. 6 represents a view similar to Fig. 3 showing a different form of socket member, the stud member being omitted. Fig. 7 represents in elevation stud and socket members of the form shown in Figs. 1, 3 and 5, said members being disconnected from each other. Fig. 8 represents a view similar to Fig. 7 representing a form of stud member adapted for use in a carriage curtain fastener and attached to a member of a carriage top frame, the stud and socket members being connected. Fig. 9 represents a side view of the socket member shown in Fig. 8. Fig. 10 represents a perspective view of the stud member shown in Fig. 8 and portions of the jaws of the socket member. Fig. 11 represents a detail modification.

Similar reference characters indicate the same or similar parts in all the figures.

The stud member 12 of my improved fastener is substantially circular in cross section and is provided with suitable means for attaching it to the part whereby it is carried, said means as shown in Figs. 4, 5 and 7 being a tubular shank 13 formed on the inner end of the stud member and adapted to be inserted and upset upon a carrying part such as a flexible piece 14, which may be a part of a glove or other garment. In Figs. 8 and 10 the stud is provided with a base or flange 15 adapted to be attached by screws to a member 16 which may be a part of a carriage top frame, the corresponding socket member being attached to a carriage curtain 17. The circular stud member is provided with an inwardly facing shoulder 19, which as here shown is the outer side of a peripheral groove, said shoulder surrounding the axis of the stud member and being therefore continuous or endless. The form of the shoulder is such that it resists a direct outward rectilinear movement of the socket jaws hereinafter described, in the direction of the axis of the stud member, the shoulder preferably having a flat surface arranged in a plane at right angles with the axis of the stud member, although it is obvious that the shoulder may be slightly undercut as shown by Fig. 11. The outer end portion of the stud member is tapered to form an approximately conical entering end adapted to displace the jaws of the socket member outwardly and cause said jaws to spring into engagement with the shoulder 19 when the groove of which said shoulder forms the outer side coincides with the jaws.

The socket member comprises a suitable casing or holder adapted to be applied to one of the two parts to be connected by the fastener, and a pair of resilient jaws carried by the holder and adapted to spring into engagement with the shoulder 19 of the stud member when the stud and socket members are brought into predetermined relative positions. The casing or holder portion of the socket member in the present embodiment of my invention is composed of a front plate 20 having a marginal flange 21 and a back plate 22 suitably connected with the flange 21, the said front and back plates forming the sides of a space in which the jaws are adapted to move toward and from each other. The holder is provided with an opening or passage for the reception of the stud member, said passage being formed by orifices 24, 25, formed respectively in the front and back plates of the holder.

26, 26 represent the resilient jaws which are composed of wire and are preferably the end portions of a single piece of wire bent into substantially the form indicated by Figs. 3 and 6, the central portion of the piece of wire being curved and bearing against a portion of the holder, while the end portions of the wire which form the jaws 26 are bent abruptly inward from the central portion and are arranged and adapted to normally spring inwardly into the path of a stud member entering the passage in the holder. The jaws are movable in a plane at right angles with the axis of the stud member when the stud and socket members are operatively related. The formation of the jaws is such that when they are engaged with the groove of the stud member, elongated portions $26^a$ of the jaws are substantially parallel with each other and are tangential to the periphery of the stud member and extend obliquely across the shoulder 19, while portions $26^b$ are curved or segmental to conform to the periphery of the stud member at the bottom of the groove therein and have elongated bearings on the shoulder 19. The portions $26^b$ are preferably formed to bear on about one-half of the diameter of the bottom of the groove in the stud member, two of their extremities practically meeting at one side of the stud member. The portions $26^a$ extend from the opposite extremities of the segmental portions. The described form of the shoulder 19 enables the portions of said shoulder on which the segmental portions of the jaws bear, to resist a direct rectilinear outward movement of the socket in the direction of the axis of the stud member, hence it is impossible to separate the socket member from the stud member by a direct outward pull. The portions $26^a$ of the jaws extend obliquely across portions of the shoulder 19, enabling the jaws to be displaced or sprung outwardly by a tipping movement of the socket member relatively to the stud member, but owing to the described formation of the jaws this tipping movement can take place only in the direction required to force the tangential portions $26^a$ of the jaws against the shoulder 19, a tipping motion of the socket member in other directions being prevented by the elongated bearing of the segmental portions $26^b$ on the shoulder 19. When therefore, the jaws are engaged with the stud member, they can be displaced and disengaged therefrom by an upward tipping movement of the socket in a direction indicated by the arrow $x$ (Figs. 5 and 10), the bearing of the portions $26^b$ of the jaws on the said shoulders preventing a downward tipping movement of the socket member either in the direction of the arrows $y$ or $z$, $z$ (Fig. 10), the arrow $y$ indicating a forward and downward tipping movement of the upper end of the socket member, while the arrows $z$, $z$ indicate forward horizontal tipping movements of the edges of the socket. The arrow $x$ representing the only direction in which the socket member can be tipped, indicates a movement which carries the lower end of the socket member outward and upward, as indicated by Fig. 5. Provision is therefore made for securely holding the stud and socket members in their interlocked relation against displacement in all directions but one, viz., a tipping movement in the direction indicated by the arrow $x$, a movement of the socket member relative to the stud member in all other directions being impossible in the ordinary usage of the device. The interlocking of the socket member with the stud member, so that the socket member can be displaced only by a tipping movement, and that in one direction, is also disclosed in the patent above mentioned, but in that patent the described result is due in part to a peculiar formation of the stud member, which formation requires that it be secured to the part which carries it, in a predetermined position relatively to the jaws of the socket member.

The circular or cylindrical form of the stud member is an important feature of the present invention and enables the result above described to be obtained without care as to the position of the stud member other than that necessary to cause it to properly enter the passage in the socket member, it being immaterial which side of the stud member is presented in a given direction. In other words no predetermination of the position of the perimeter of the stud relatively to its axis is required. Consequently, in applying the stud member to the part which carries it, no care is required except to locate the axis of the stud member so that it will be in the path of the opening in the socket member. This freedom from the necessity of locating the stud member in a predetermined way, so far as the direction in which its sides face is concerned, is especially useful in a fastener for carriage curtains where the stud member is to be attached to a part 16 of a carriage top frame, the cylindrical or circular stud member being applicable to the part 16 with either of its sides uppermost.

It will be seen by reference to Figs. 3 and 5 that the portions of the shoulder 19 on which the segmental jaw portions 26$^b$ bear, constitute seats for said jaw portions, and that the portions of the shoulder across which the tangential jaw portions 26$^a$ extend obliquely, constitute a wedge which is caused by an upward tipping movement of the socket member in the direction of the arrow $x$, to force the jaws outwardly. It will also be seen that the circular form of the stud and the resulting continuity of the shoulder 19 enables any portions of the shoulder to be utilized as the jaw seats and wedge.

The jaw-holding portion of the socket member is preferably provided with stops 28 which are arranged to abut against the free ends of the jaws when the latter are displaced by the entering portion of the stud member, the arrangement of the stops being such that the end portions of the jaws bearing against them are deflected inwardly by the outward pressure exerted on them by the stud member when the jaws are displaced, so that additional stresses are set up in the jaws tending to accelerate their inward springing movement when the jaws and the groove of the stud member coincide. By this means I cause the jaws to engage the stud member with a sharp click which is audible to the operator and assures him that the parts have been properly connected.

When the holder portion of the socket member is constructed as shown in Figs. 1, 2, 3 and 4 inclusive, the front plate 20 is preferably provided with short ears 29 which are turned or clenched over the inner side of the back plate, and with longer ears 30 which are passed through the part 17 which carries the socket member and are clenched upon one side of said part.

In Figs. 8 and 9 I show the back plate 22 provided with an eyelet 31 which surrounds the opening through the back plate and is adapted to be passed through the curtain or other part 17 and upset at its outer end thereon, the eyelet therefore taking the place of the prongs 30.

The general form of the jaw-holding portion of the socket member may be varied. In Figs. 1 and 3 said portion is of oblong form, while in Fig. 6 it is shown as circular.

The inner side of the groove of which the shoulder 19 forms the outer side, may be tapered as shown by Fig. 11, so that when socket members of two or more carriage curtains are engaged with one stud member, the inner socket member or members may slide backwardly along the stud member as far as may be required, the jaws of the outer socket member being engaged as described with the shoulder 19.

The terms "upward" and "downward" used to define the directions in which the parts may and may not be tipped, are employed relatively, and to indicate concisely that a tipping movement in one direction to separate the parts is permitted, while a tipping movement in a different direction or directions is impossible.

The segmental portions of the socket member jaws, and the annular form of the jaw-engaging shoulder on the stud member, confer the following advantages, (1) the jaws have a firm bearing on practically one-half of the circumference of the stud member, each jaw bearing on substantially one-quarter of said circumference. Each jaw therefore has a firm engagement with the stud member and the two jaws coöperate in resisting strain or pressure exerted by wind directed against the interior of a carriage top, or otherwise, so that such strain is always resisted equally by two jaws instead of being resisted more by one jaw than by the other as heretofore. (2) The amplitude, or extent of the tipping movement of the socket necesssary to disengage it from the stud, is reduced to the minimum. In other words, the necessary inward movement of one end of the socket member toward the support of the stud member is not as great as heretofore, so that the stud member may be made relatively short, the fastener as a whole being reduced to the minimum. In other words, the necessary inward movement of one of the socket members toward the support of the stud member is not as great as heretofore, so that the stud member may be made relatively short, the fastener as a whole being reduced to a desirably compact form.

The words "formed at all parts of its surface to permit a direct outward movement of said segmental jaw portions"—hereinafter employed in characterizing the inwardly facing annular shoulder of the stud member, are intended to convey the idea that the surface of said shoulder may be either flat and in a plane substantially at right angles with the axis of the stud as shown by Figs. 4, 5, 8 and 9, or slightly tapered or undercut as shown by 12.

The segmental portions 26ᵇ and the parallel portions 26ᵃ collectively constitute a U-shaped yoke, the curved end of which (formed by the two segmental portions 26ᵇ) bears on substantially one-half of the periphery of the stud below the shoulder 12, and coöperates with a corresponding elongated portion of the shoulder to oppose not only a direct outward movement of the socket member, but also a tipping movement thereof excepting in one direction, while the sides of the yoke (formed by the two parallel portions 26ᵃ) extend across other portions of the shoulder and coöperate therewith to force the curved end of the yoke out of engagement with the shoulder when the socket member is tipped in said direction.

I claim:—

A stud-and-socket fastener comprising a stud member having an annular inwardly facing shoulder surrounding the axis of the stud member, and a socket member provided with resilient jaws adapted to spring inwardly toward the axis of the stud member and having segmental portions adapted to bear simultaneously against an extended portion of said shoulder, said shoulder being formed at all parts of its surface to prevent a direct outward movement of said segmental jaw portions, the jaws also having practically straight elongated tangential portions which extend substantially parallel with each other from said segmental portions and obliquely across said shoulder at points which are separated by a jaw-displacing portion of the shoulder, the jaws being displaceable outwardly, to disengage their segmental portions from the shoulder, only by a tipping movement which causes the displacing portion of the shoulder to exert a spreading action on the substantially parallel portions of the jaws, the annular form of the shoulder enabling any extended portion of its surface to positively lock the segmental portions of the jaws against a direct outward pull, and the edge of the remaining portion to act in spreading the jaws.

In testimony whereof I have affixed my signature, in presence of two witnesses.

FRED S. CARR.

Witnesses:
C. F. BROWN,
P. W. PEZZETTI.